United States Patent
Aiba

(10) Patent No.: US 12,513,279 B2
(45) Date of Patent: Dec. 30, 2025

(54) STEREOSCOPIC VIDEO DISPLAY DEVICE, STEREOSCOPIC VIDEO DISPLAY METHOD, AND COMPUTER-READABLE STORAGE MEDIUM

(71) Applicant: JVCKENWOOD Corporation, Yokohama (JP)

(72) Inventor: Hideki Aiba, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 182 days.

(21) Appl. No.: 18/462,447

(22) Filed: Sep. 7, 2023

(65) Prior Publication Data

US 2023/0421745 A1    Dec. 28, 2023

Related U.S. Application Data

(63) Continuation of application No. PCT/JP2022/008663, filed on Mar. 1, 2022.

(30) Foreign Application Priority Data

Mar. 15, 2021    (JP) ................................ 2021-041610

(51) Int. Cl.
*H04N 13/279*    (2018.01)
*H04N 13/282*    (2018.01)
(Continued)

(52) U.S. Cl.
CPC ......... *H04N 13/279* (2018.05); *H04N 13/282* (2018.05); *H04N 13/293* (2018.05); *H04N 13/302* (2018.05); *H04N 13/366* (2018.05)

(58) Field of Classification Search
CPC .. H04N 13/279; H04N 13/302; H04N 13/293; H04N 13/282; H04N 13/366;
(Continued)

(56) References Cited

U.S. PATENT DOCUMENTS 4,160,973 A * 7/1979 Berlin, Jr. ............ H04N 13/393
345/82
4,339,168 A * 7/1982 Haines ..................... G03H 1/20
359/23

(Continued)

FOREIGN PATENT DOCUMENTS

| EP | 0996093 | 1/1994 |
|---|---|---|
| JP | 08-088870 | 4/1996 |
| JP | 10-234057 | 9/1998 |

OTHER PUBLICATIONS

X. Cheng, M. Idesawa and Q. Wang, "Volume perception in motion parallax," 2008 SICE Annual Conference, Chofu, Japan, 2008, pp. 191-195, doi: 10.1109/SICE.2008.4654648. (Year: 2008).*

(Continued)

*Primary Examiner* — Charles L Beard
(74) *Attorney, Agent, or Firm* — Amin, Turocy & Watson, LLP

(57) ABSTRACT

A stereoscopic video display device includes: an image display unit configured to display an image; an observer position detection unit configured to detect a position of a nearby observer; a rendering unit configured to form an image of a virtual object corresponding to the position of the observer detected by the observer position detection unit; a rotation unit configured to rotate the image display unit to a position facing the observer detected by the observer position detection unit; a background image obtainment unit configured to obtain an image of a background behind the image display unit; and an image composition processing unit configured to generate a composite image in which the image of the virtual object formed by the rendering unit is superimposed on the image of the background obtained by the background image obtainment unit, and display the composite image on the image display unit.

5 Claims, 8 Drawing Sheets

(51) Int. Cl.
*H04N 13/293* (2018.01)
*H04N 13/302* (2018.01)
*H04N 13/366* (2018.01)

(58) Field of Classification Search
CPC ........ H04N 13/393; G02B 3/54; G09F 13/30; G09F 19/02; G09G 3/005
See application file for complete search history.

(56) References Cited

U.S. PATENT DOCUMENTS

| | | | | |
|---|---|---|---|---|
| 4,922,336 A * | 5/1990 | Morton | G02B 30/54 | 348/E13.058 |
| 4,943,851 A * | 7/1990 | Lang | H04N 13/363 | 348/E13.059 |
| 5,072,215 A * | 12/1991 | Brotz | H04N 13/398 | 348/E13.058 |
| 5,082,350 A * | 1/1992 | Garcia | H04N 13/393 | 348/51 |
| 5,148,310 A * | 9/1992 | Batchko | G09G 3/002 | 348/E13.058 |
| 5,162,787 A * | 11/1992 | Thompson | H04N 13/363 | 348/E13.058 |
| 5,239,892 A * | 8/1993 | Sakai | B23Q 1/52 | 384/100 |
| 5,394,202 A * | 2/1995 | Deering | H04N 13/341 | 348/E13.058 |
| 5,604,525 A * | 2/1997 | Kieselbach | G06K 7/10594 | 347/169 |
| 5,606,454 A * | 2/1997 | Williams | G09F 19/18 | 359/479 |
| 5,661,599 A * | 8/1997 | Borner | G02B 30/27 | 348/E13.043 |
| 5,678,910 A * | 10/1997 | Martin | G02B 30/50 | 348/E13.058 |
| 5,703,606 A * | 12/1997 | Blundell | H04N 13/393 | 348/E13.055 |
| 5,815,314 A * | 9/1998 | Sudo | H04N 13/349 | 348/E13.043 |
| 5,854,613 A * | 12/1998 | Soltan | G09G 3/025 | 348/E13.058 |
| 5,859,609 A * | 1/1999 | Sheen | G01S 7/412 | 342/179 |
| 5,905,564 A * | 5/1999 | Long | A63H 33/22 | 352/101 |
| 6,052,100 A * | 4/2000 | Soltan | H04N 13/393 | 348/E13.058 |
| 6,061,083 A * | 5/2000 | Aritake | H04N 13/117 | 348/E13.043 |
| 6,064,423 A * | 5/2000 | Geng | G02B 30/54 | 348/E13.058 |
| 6,072,545 A * | 6/2000 | Gribschaw | G03B 21/562 | 348/789 |
| 6,111,597 A * | 8/2000 | Tabata | H04N 13/128 | 348/E13.047 |
| 6,115,006 A * | 9/2000 | Brotz | H04N 13/398 | 348/E13.058 |
| 6,177,913 B1 * | 1/2001 | Whitesell | G09G 3/025 | 348/42 |
| 6,183,088 B1 * | 2/2001 | LoRe | H04N 13/393 | 348/E13.058 |
| 6,208,318 B1 * | 3/2001 | Anderson | H04N 13/398 | 348/E13.035 |
| 6,278,419 B1 * | 8/2001 | Malkin | G09G 3/005 | 348/E13.056 |
| 6,302,542 B1 * | 10/2001 | Tsao | G03B 21/28 | 359/479 |
| 6,304,286 B1 * | 10/2001 | Shirai | H04N 13/15 | 348/E13.043 |
| 6,335,714 B1 * | 1/2002 | Wang | G09G 3/003 | 345/82 |
| 6,487,020 B1 * | 11/2002 | Favalora | H04N 13/393 | 348/E13.043 |
| 6,559,840 B1 * | 5/2003 | Lee | G02B 27/06 | 345/419 |
| 6,697,034 B2 * | 2/2004 | Tashman | G02B 30/50 | 345/31 |
| 6,753,847 B2 * | 6/2004 | Kurtenbach | H04N 13/388 | 348/42 |
| 6,900,779 B1 * | 5/2005 | Geng | H04N 13/395 | 345/32 |
| 6,969,174 B1 * | 11/2005 | Radulescu | G02B 30/54 | 353/7 |
| 7,006,163 B2 * | 2/2006 | Yamamoto | G02B 27/104 | 348/742 |
| 7,099,701 B2 * | 8/2006 | Lo | G09G 3/005 | 345/82 |
| 7,118,228 B2 * | 10/2006 | May | G09F 19/18 | 359/449 |
| 7,138,997 B2 * | 11/2006 | Balakrishnan | G06F 3/04812 | 345/419 |
| 7,284,865 B1 * | 10/2007 | Lee | G02B 27/147 | 348/742 |
| 7,324,085 B2 * | 1/2008 | Balakrishnan | G06F 3/038 | 345/157 |
| 7,477,252 B2 * | 1/2009 | Chun | H04N 13/393 | 348/E13.056 |
| 7,537,345 B2 * | 5/2009 | Refai | G03B 21/28 | 353/7 |
| 7,554,541 B2 * | 6/2009 | Fitzmaurice | G06F 3/04815 | 345/424 |
| 7,692,605 B2 * | 4/2010 | Tsao | G02B 30/54 | 353/7 |
| 7,839,400 B2 * | 11/2010 | Kurtenbach | G06T 15/00 | 345/419 |
| 7,858,913 B2 * | 12/2010 | Refai | G03B 35/20 | 353/94 |
| 8,159,528 B2 * | 4/2012 | Takayoshi | H04N 13/388 | 348/51 |
| 8,539,701 B2 * | 9/2013 | Kobayashi | H04N 13/302 | 40/430 |
| 8,587,640 B2 * | 11/2013 | Gavrilenco | G09G 3/003 | 348/42 |
| 8,787,005 B2 * | 7/2014 | Kobayashi | G03B 35/18 | 361/679.01 |
| 9,053,660 B2 * | 6/2015 | Liu | H04N 13/363 | |
| 9,091,911 B2 * | 7/2015 | Christensen | H04N 9/31 | |
| 9,256,974 B1 * | 2/2016 | Hines | H04N 13/282 | |
| 9,576,377 B1 * | 2/2017 | Yett | H04N 13/365 | |
| 9,906,767 B2 * | 2/2018 | Choo | G06F 3/013 | |
| 10,136,125 B2 * | 11/2018 | Yoon | G09G 3/003 | |
| 10,192,472 B1 * | 1/2019 | Nocon | G09G 3/005 | |
| 10,298,921 B1 * | 5/2019 | Frayne | G02B 30/27 | |
| 10,310,284 B1 * | 6/2019 | Waldron | H04N 13/398 | |
| 10,339,844 B1 * | 7/2019 | Nocon | G05B 15/02 | |
| 10,360,876 B1 * | 7/2019 | Rahman | G09G 5/14 | |
| 10,417,808 B2 * | 9/2019 | Noshi | G06T 15/08 | |
| 10,645,377 B2 * | 5/2020 | Ji | H04N 13/286 | |
| 10,657,854 B2 * | 5/2020 | Nocon | G09F 13/20 | |
| 10,666,931 B2 * | 5/2020 | Huang | G02B 27/30 | |
| 10,732,431 B2 * | 8/2020 | Kim | G02B 30/52 | |
| 10,754,296 B1 * | 8/2020 | Zhang | G03H 1/2202 | |
| 10,969,666 B1 * | 4/2021 | Haseltine | H04N 9/3194 | |
| 11,022,814 B2 * | 6/2021 | Joseph | G09F 19/18 | |
| 11,025,892 B1 * | 6/2021 | Aman | H04N 13/337 | |
| 11,048,108 B2 * | 6/2021 | Nocon | G06F 1/1601 | |
| 11,164,489 B2 * | 11/2021 | Nocon | G09F 13/16 | |
| 11,402,657 B2 * | 8/2022 | Ohyama | H04N 13/398 | |
| 11,423,621 B1 * | 8/2022 | Atlas | G06T 5/92 | |
| 11,652,977 B2 * | 5/2023 | Shao | H04N 13/296 | 348/47 |
| 11,823,343 B1 * | 11/2023 | Govil | G02B 27/0101 | |
| 11,831,860 B2 * | 11/2023 | Ma | H04N 13/305 | |
| 11,838,495 B1 * | 12/2023 | Wilburn | H04N 13/366 | |
| 12,124,215 B2 * | 10/2024 | Hirose | G02F 1/292 | |
| 12,192,437 B2 * | 1/2025 | Kaehler | G02B 30/56 | |
| 12,278,943 B2 * | 4/2025 | Wang | G09G 5/00 | |
| 2001/0048405 A1 * | 12/2001 | Salley | G09F 27/00 | 345/30 |

(56) References Cited

U.S. PATENT DOCUMENTS

| | | | |
|---|---|---|---|
| 2002/0126119 A1* | 9/2002 | Tashman | H04N 13/398 348/E13.059 |
| 2002/0148148 A1* | 10/2002 | Smith | G09F 15/0087 40/473 |
| 2003/0086167 A1* | 5/2003 | Sonehara | G02B 30/30 348/E13.059 |
| 2003/0095079 A1* | 5/2003 | Ishikawa | G03B 15/10 345/6 |
| 2003/0184831 A1* | 10/2003 | Lieberman | G09F 19/12 359/22 |
| 2003/0222977 A1* | 12/2003 | Yoshino | H04N 13/395 348/51 |
| 2004/0046885 A1* | 3/2004 | Regan | H04N 13/282 348/E13.043 |
| 2004/0090523 A1* | 5/2004 | Kondo | H04N 13/128 348/E13.067 |
| 2004/0196362 A1* | 10/2004 | Hoshino | G03B 35/24 348/E13.028 |
| 2005/0035962 A1* | 2/2005 | Ishibashi | H04N 13/243 345/110 |
| 2005/0062684 A1* | 3/2005 | Geng | G09G 3/002 345/32 |
| 2005/0094111 A1* | 5/2005 | May | G03B 21/28 353/98 |
| 2005/0213182 A1* | 9/2005 | Cossairt | H04N 13/363 348/E13.058 |
| 2006/0038881 A1* | 2/2006 | Starkweather | H04N 13/376 348/E13.052 |
| 2006/0055887 A1* | 3/2006 | Hoshino | G02B 30/40 348/E13.058 |
| 2006/0125917 A1* | 6/2006 | Cha | H04N 13/279 348/51 |
| 2006/0132497 A1* | 6/2006 | Biegelsen | H04N 13/393 345/589 |
| 2006/0152435 A1* | 7/2006 | Kondo | G03B 21/28 348/E5.143 |
| 2006/0171008 A1* | 8/2006 | Mintz | H04N 13/363 348/E13.058 |
| 2006/0181688 A1* | 8/2006 | Hoshino | H04N 13/393 353/122 |
| 2006/0273983 A1* | 12/2006 | Koo | G02B 30/52 345/6 |
| 2007/0009222 A1* | 1/2007 | Koo | H04N 13/395 348/E13.057 |
| 2007/0064098 A1* | 3/2007 | Tran | G06T 7/30 348/E13.058 |
| 2007/0064201 A1* | 3/2007 | Hoshino | G03B 35/24 353/31 |
| 2007/0165024 A1* | 7/2007 | Tsao | H04N 13/324 345/420 |
| 2007/0171275 A1* | 7/2007 | Kenoyer | H04N 7/142 348/E13.071 |
| 2007/0216601 A1* | 9/2007 | Tomisawa | G02B 27/028 345/9 |
| 2008/0043014 A1* | 2/2008 | Tachi | G02B 30/54 348/E13.056 |
| 2008/0068372 A1* | 3/2008 | Krah | H04N 13/368 348/E13.058 |
| 2008/0130974 A1* | 6/2008 | Xu | A61B 6/482 382/128 |
| 2008/0218854 A1* | 9/2008 | Hoshino | H04N 13/302 359/462 |
| 2008/0266523 A1* | 10/2008 | Otsuka | H04N 13/349 348/E13.058 |
| 2009/0066786 A1* | 3/2009 | Landa | H04N 13/282 348/E13.001 |
| 2009/0284585 A1* | 11/2009 | Tsai | H04N 1/00129 348/48 |
| 2009/0303313 A1* | 12/2009 | Yukich | H04N 13/393 348/51 |
| 2010/0014053 A1* | 1/2010 | Brentnall, III | G03B 21/00 353/7 |
| 2010/0020254 A1* | 1/2010 | Geng | G03B 21/006 353/7 |
| 2010/0171681 A1* | 7/2010 | Cabanas | G09G 3/005 345/31 |
| 2010/0171697 A1* | 7/2010 | Son | H04N 13/279 348/E13.001 |
| 2010/0315492 A1* | 12/2010 | Baik | H04N 13/366 348/51 |
| 2011/0069157 A1* | 3/2011 | Ito | H04N 13/32 348/51 |
| 2011/0074936 A1* | 3/2011 | Gavrilenco | H04N 13/395 348/51 |
| 2011/0128555 A1* | 6/2011 | Rotschild | G06F 3/011 359/9 |
| 2011/0199373 A1* | 8/2011 | Liu | H04N 13/354 345/419 |
| 2011/0216160 A1* | 9/2011 | Martin | G03H 1/2249 348/E13.001 |
| 2011/0234772 A1* | 9/2011 | Ito | G02B 30/24 257/E33.056 |
| 2011/0304614 A1* | 12/2011 | Yasunaga | H04N 13/31 345/419 |
| 2012/0038636 A1* | 2/2012 | Montague | G06T 3/60 345/419 |
| 2012/0062556 A1* | 3/2012 | Yamamoto | H04N 13/366 345/419 |
| 2012/0139897 A1* | 6/2012 | Butler | G06F 3/041 715/764 |
| 2012/0146897 A1* | 6/2012 | Yoshida | G02B 30/56 345/156 |
| 2012/0147003 A1* | 6/2012 | Liu | H04N 13/349 345/419 |
| 2012/0200681 A1* | 8/2012 | Yoshida | G09F 19/125 348/55 |
| 2012/0293632 A1* | 11/2012 | Yukich | H04N 23/90 348/47 |
| 2013/0063438 A1* | 3/2013 | Billett | H04N 13/39 345/424 |
| 2013/0100126 A1* | 4/2013 | Kim | H04N 13/393 345/419 |
| 2013/0100358 A1* | 4/2013 | De Collibus | G03B 21/28 353/15 |
| 2013/0201083 A1* | 8/2013 | Park | G02B 30/54 345/31 |
| 2014/0118511 A1* | 5/2014 | Hyde | H04N 13/366 348/54 |
| 2014/0192168 A1* | 7/2014 | Shimoyama | H04N 13/351 348/50 |
| 2014/0192329 A1* | 7/2014 | Shin | G03B 35/20 353/30 |
| 2014/0306963 A1* | 10/2014 | Sun | H04N 13/366 345/427 |
| 2014/0307064 A1* | 10/2014 | Horimai | H04N 13/363 348/51 |
| 2015/0085089 A1* | 3/2015 | Shigemura | H04N 13/351 348/54 |
| 2015/0189256 A1* | 7/2015 | Stroetmann | H04N 13/366 348/54 |
| 2015/0341626 A1* | 11/2015 | Kim | H04N 13/366 348/51 |
| 2015/0362742 A1* | 12/2015 | Yoneno | G03B 21/2066 353/7 |
| 2015/0362744 A1* | 12/2015 | Park | H04N 13/30 345/31 |
| 2016/0105660 A1* | 4/2016 | Ito | H04N 13/282 348/46 |
| 2016/0150222 A1* | 5/2016 | Luo | G06F 3/04815 348/43 |
| 2016/0219267 A1* | 7/2016 | Chu | H04N 13/302 |
| 2016/0219268 A1* | 7/2016 | Ström | H04N 13/398 |
| 2016/0267720 A1 | 9/2016 | Mandella et al. | |
| 2016/0337630 A1* | 11/2016 | Raghoebardajal | A63F 13/212 |
| 2016/0360187 A1* | 12/2016 | Smithwick | G02B 30/27 |
| 2016/0366392 A1* | 12/2016 | Raghoebardajal | H04N 13/332 |
| 2017/0034505 A1* | 2/2017 | Fusama | H04N 13/128 |
| 2017/0139375 A1* | 5/2017 | Chung | G03H 1/0005 |

(56) References Cited

U.S. PATENT DOCUMENTS

| | | | |
|---|---|---|---|
| 2017/0140791 A1* | 5/2017 | Das | H04N 23/698 |
| 2017/0150133 A1* | 5/2017 | Yoshida | H04N 13/393 |
| 2017/0223344 A1* | 8/2017 | Kaehler | H04N 13/393 |
| 2018/0024373 A1* | 1/2018 | Joseph | G02B 30/56 |
| | | | 359/629 |
| 2018/0091738 A1* | 3/2018 | Takahashi | H04N 7/14 |
| 2018/0097867 A1* | 4/2018 | Pang | H04N 5/2226 |
| 2018/0184074 A1* | 6/2018 | Hunter | G06F 3/147 |
| 2019/0025913 A1* | 1/2019 | Cheng | G06F 3/013 |
| 2019/0035317 A1* | 1/2019 | Rohena | G09G 3/02 |
| 2019/0098278 A1* | 3/2019 | Koizumi | G06T 15/20 |
| 2019/0139483 A1* | 5/2019 | Zeng | G09G 3/005 |
| 2019/0156710 A1* | 5/2019 | Hanson | G09F 9/335 |
| 2019/0271943 A1* | 9/2019 | Bezirganyan | H04N 13/302 |
| 2019/0281280 A1* | 9/2019 | Baldwin | G06T 7/70 |
| 2019/0306486 A1* | 10/2019 | Nakajima | H04N 13/189 |
| 2019/0324284 A1* | 10/2019 | Haseltine | G09G 3/003 |
| 2019/0340962 A1* | 11/2019 | Trehan | G09G 3/005 |
| 2019/0342537 A1* | 11/2019 | Taya | H04N 13/282 |
| 2019/0379843 A1* | 12/2019 | Lam | H04N 7/147 |
| 2020/0051336 A1* | 2/2020 | Ichikawa | G06T 19/006 |
| 2020/0142207 A1* | 5/2020 | Chin | H04N 13/32 |
| 2020/0145644 A1* | 5/2020 | Cordes | G06T 15/50 |
| 2020/0159035 A1* | 5/2020 | Haseltine | G02B 30/54 |
| 2020/0195911 A1* | 6/2020 | Haseltine | H04N 13/305 |
| 2020/0301135 A1* | 9/2020 | Yano | G03B 17/54 |
| 2021/0004081 A1* | 1/2021 | Sugihara | G06F 3/013 |
| 2021/0120227 A1* | 4/2021 | Masumura | H04N 13/376 |
| 2021/0136349 A1* | 5/2021 | Itakura | H04N 13/111 |
| 2021/0166485 A1* | 6/2021 | Islamov | G06T 7/70 |
| 2021/0192996 A1* | 6/2021 | Onuki | G09F 9/37 |
| 2021/0263328 A1* | 8/2021 | Nakamura | G03B 21/10 |
| 2021/0306612 A1* | 9/2021 | Ma | G02B 30/54 |
| 2021/0314556 A1* | 10/2021 | Fattal | G09G 3/3406 |
| 2021/0344890 A1* | 11/2021 | Namba | H04N 13/117 |
| 2021/0344894 A1* | 11/2021 | Stokes | G09G 3/005 |
| 2021/0356739 A1* | 11/2021 | Yano | G03B 35/20 |
| 2021/0377515 A1* | 12/2021 | Aga | H04N 13/344 |
| 2021/0400253 A1* | 12/2021 | Sun | G09G 3/008 |
| 2022/0092814 A1* | 3/2022 | Eberspach | G06T 7/74 |
| 2022/0174257 A1* | 6/2022 | Bosworth | H04N 13/117 |
| 2022/0182517 A1* | 6/2022 | Lai | A47F 3/11 |
| 2022/0207848 A1* | 6/2022 | Islamov | G06T 19/006 |
| 2022/0208040 A1* | 6/2022 | Kumagai | G09G 3/001 |
| 2022/0385885 A1* | 12/2022 | Mitani | G02B 5/32 |
| 2023/0029822 A1* | 2/2023 | Ogawa | G02B 27/017 |
| 2023/0039906 A1* | 2/2023 | Kasegawa | G02B 27/102 |
| 2023/0146498 A1* | 5/2023 | Mate | H04N 21/8456 |
| | | | 348/14.13 |
| 2023/0237944 A1* | 7/2023 | Mitani | G09G 5/00 |
| | | | 345/156 |
| 2023/0254465 A1* | 8/2023 | Ross | G06F 3/012 |
| | | | 386/230 |
| 2023/0291865 A1* | 9/2023 | Handa | H04N 13/282 |
| 2023/0300315 A1* | 9/2023 | Mitani | G06T 19/00 |
| 2023/0350223 A1* | 11/2023 | Castleman | G09G 3/003 |
| 2023/0418089 A1* | 12/2023 | Kasegawa | G02B 5/32 |
| 2024/0106983 A1* | 3/2024 | Agrawal | G06T 7/70 |
| 2024/0223738 A1* | 7/2024 | Arimatsu | H04N 13/282 |
| 2024/0348763 A1* | 10/2024 | Cardenas Gasca | G06V 40/20 |
| 2024/0397028 A1* | 11/2024 | Yu | H04N 13/302 |
| 2024/0420411 A1* | 12/2024 | Shimakawa | H04N 5/2621 |
| 2025/0016298 A1* | 1/2025 | Oka | H04N 13/366 |
| 2025/0047829 A1* | 2/2025 | Dell | H04N 13/344 |
| 2025/0078401 A1* | 3/2025 | Biswas | G06T 7/20 |
| 2025/0080710 A1* | 3/2025 | Nims | H04N 13/271 |
| 2025/0093654 A1* | 3/2025 | Hua | G02B 27/0172 |
| 2025/0133198 A1* | 4/2025 | Horikawa | H04N 13/344 |
| 2025/0142045 A1* | 5/2025 | Aman | H04N 21/44029 |
| 2025/0168319 A1* | 5/2025 | Shimizu | H04N 13/346 |
| 2025/0208721 A1* | 6/2025 | Oya | G06F 3/011 |

OTHER PUBLICATIONS

T. Suenaga, Y. Tamai, Y. Kurita, Y. Matsumoto and T. Ogasawara, "Poster: Image-Based 3D Display with Motion Parallax using Face Tracking," 2008 IEEE Symposium on 3D User Interfaces, Reno, NV, USA, 2008, pp. 161-162, doi: 10.1109/3DUI.2008.4476617. (Year: 2008).*

Extended European Search Report for European Patent Application No. 22771104.1 dated Jul. 4, 2024.

International Search Report and Written Opinion for International Application No. PCT/JP2022/008663 mailed on May 24, 2022, 8 pages.

* cited by examiner

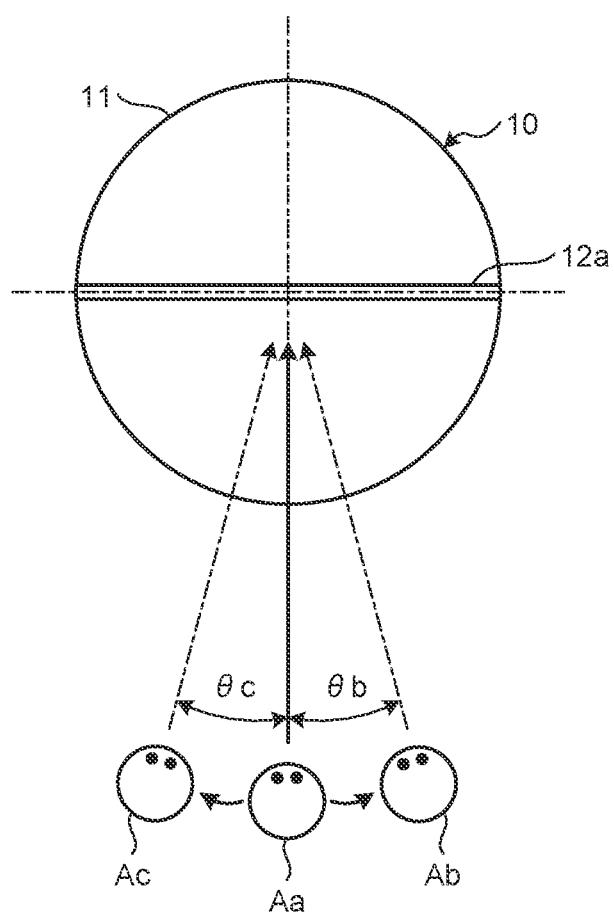

STEREOSCOPIC VIDEO DISPLAY DEVICE, STEREOSCOPIC VIDEO DISPLAY METHOD, AND COMPUTER-READABLE STORAGE MEDIUM

CROSS-REFERENCE TO RELATED APPLICATIONS

This application is a Continuation of International Application No. PCT/JP2022/008663, filed Mar. 1, 2022, which designates the United States, incorporated herein by reference, and which claims the benefit of priority from Japanese Patent Application No. 2021-041610, filed Mar. 15, 2021, incorporated herein by reference.

BACKGROUND

The present disclosure relates to a stereoscopic video display device, a stereoscopic video display method, and a computer-readable storage medium.

A stereoscopic video display device that has been proposed recently displays a stereoscopic image as if the stereoscopic image is floating in the air and enables observation of a stereoscopic video from around the stereoscopic video display device, due to advancement of high speed CPUs. For example, a screen having a planar shape is arranged inside a transparent case having a cylindrical shape and a video is displayed on the screen. A nearby observer is tracked, the screen is rotated to face the observer at a position, and a video on the screen is changed to a video that is seen according to the position of the observer. Such a stereoscopic video display device is described in, for example, Japanese Unexamined Patent Application Publication No. H08-088870.

A screen in a conventional stereoscopic video display device rotates according to a position of an observer, a video according to the position of the observer is displayed on the screen, and the observer is able to see a stereoscopic video over a range of 360 degrees. However, when the observer moves around the stereoscopic display device, the video of the displayed object projected on the screen is changed, but the image of the background of the displayed object is not changed. Therefore, there is a problem that the video of the displayed object displayed over the background does not look right to the observer.

SUMMARY

A stereoscopic video display device according to the present disclosure includes: an image display unit configured to display an image; an observer position detection unit configured to detect a position of a nearby observer; a rendering unit configured to form an image of a virtual object corresponding to the position of the observer detected by the observer position detection unit; a rotation unit configured to rotate the image display unit to a position facing the observer detected by the observer position detection unit; a background image obtainment unit configured to obtain an image of a background behind the image display unit; and an image composition processing unit configured to generate a composite image in which the image of the virtual object formed by the rendering unit is superimposed on the image of the background obtained by the background image obtainment unit, and display the composite image on the image display unit.

A stereoscopic video display method according to the present disclosure includes: detecting a position of a nearby observer; forming an image of a virtual object corresponding to the position of the observer; rotating to a position facing the observer an image display unit configured to display an image; obtaining an image of a background behind the image display unit; and generating a composite image in which the image of the virtual object is superimposed on the image of the background, and displaying the composite image on the image display unit.

A non-transitory computer-readable storage medium according to the present disclosure stores a program causing a computer to execute: detecting a position of a nearby observer; forming an image of a virtual object corresponding to the position of the observer; rotating to a position facing the observer an image display unit configured to display an image; obtaining an image of a background behind the image display unit; and generating a composite image in which the image of the virtual object is superimposed on the image of the background, and displaying the composite image on the image display unit.

BRIEF DESCRIPTION OF THE DRAWINGS

FIG. 10 is a diagram illustrating a modified example of the stereoscopic video display according to positions of an observer, at the stereoscopic video display device according to the second embodiment.

DETAILED DESCRIPTION

Embodiments of a stereoscopic video display device, a stereoscopic video display method, and a program, according to the present disclosure will hereinafter be described in detail by reference to the appended drawings. The present invention is not limited by the following embodiments.

First Embodiment

Stereoscopic Video Display Device

Figure 1:
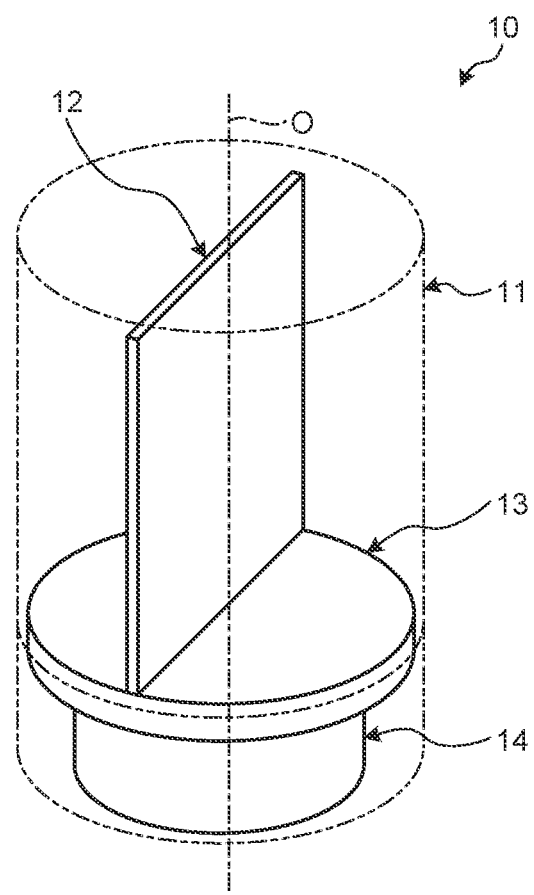
FIG. 1 is a perspective view of a stereoscopic video display device according to a first embodiment.
Figure 2:
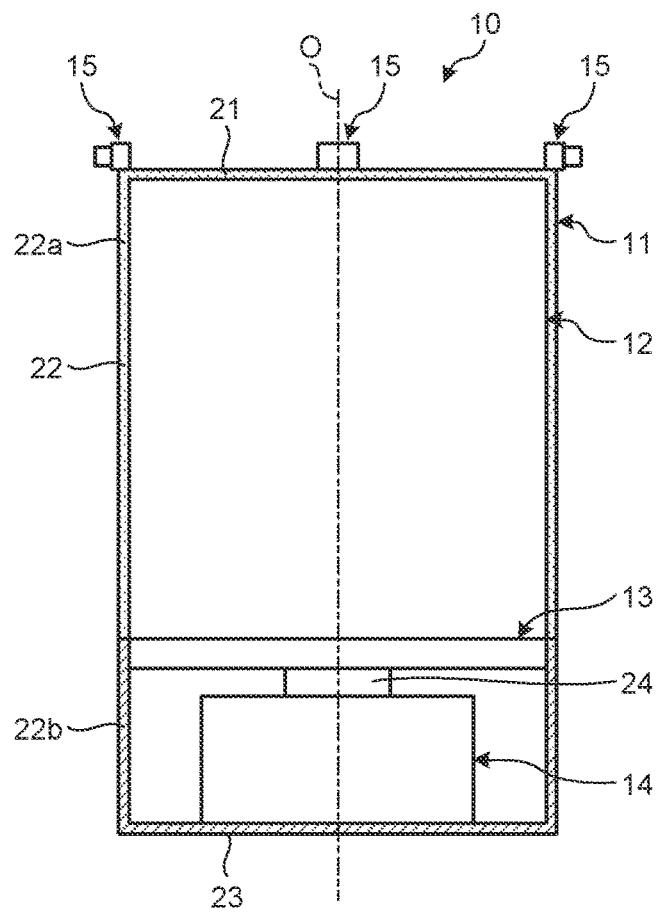
FIG. 2 is a vertical sectional view of the stereoscopic video display device.
Figure 3:
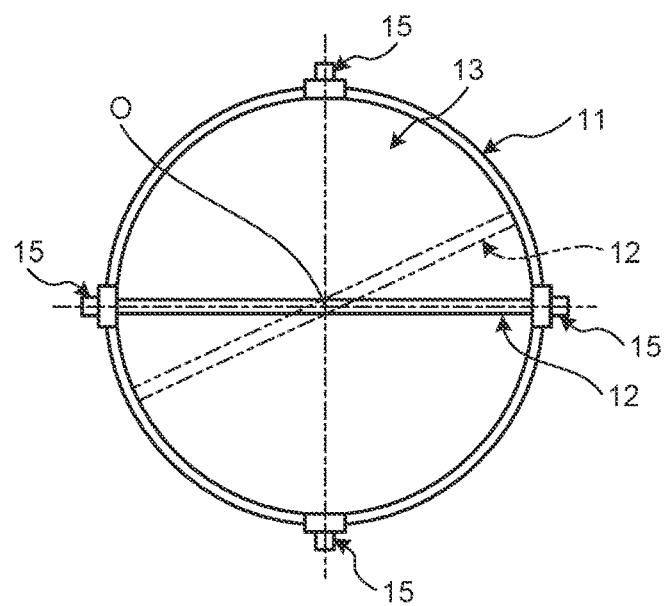
FIG. 3 is a plan view of stereoscopic video display.

FIG. 1 is a perspective view of a stereoscopic video display device according to a first embodiment, FIG. 2 is a vertical sectional view of the stereoscopic video display device, and FIG. 3 is a plan view of stereoscopic video display.

In this first embodiment, as illustrated in FIG. 1 to FIG. 3, a stereoscopic video display device (stereoscopic video display unit) 10 includes a case 11, a display (image display device (image display unit)) 12, a turntable (table rotation device (table unit)) 13, a turntable drive device (rotation device (rotation unit)) 14, and cameras (background image obtainment devices (background image obtainment units)) 15.

The case 11 has a hollow cylindrical shape. The case 11 has a ceiling portion 21, a cylinder portion 22, and a bottom portion 23. The ceiling portion 21 and the bottom portion 23 are disk-shaped and are fixed to a top portion and a bottom portion of the cylinder portion 22 having a cylindrical shape. The ceiling portion 21 is transparent. The cylinder portion 22 has a transparent portion 22a at the top and a non-transparent portion 22b at the bottom. The bottom portion 23 is non-transparent.

The turntable 13 has a disk shape. The turntable 13 is arranged between the transparent portion 22a and the non-transparent portion 22b of the cylinder portion 22, inside the case 11. The turntable 13 is arranged horizontally, and is supported to be horizontally rotatable, relatively to the case 11, about a pivot point at a center O.

The display 12 is a liquid crystal display having a planar shape. The display 12 is capable of displaying an image. The display 12 has a rectangular shape and is arranged along a direction orthogonal to the top of the turntable 13. The display 12 is arranged along a radial direction so as to pass through the center O of the turntable 13. The display 12 is arranged in the transparent portion 22a of the cylinder portion 22, inside the case 11. An observer is thus able to see an image displayed on the display 12, through the transparent portion 22a, from outside the case 11.

The turntable drive device 14 is fixed to an upper surface of the bottom portion 23 inside the case 11. The turntable drive device 14 has, for example, a motor and a speed reducer, and has an output shaft 24 along the center O of the case 11. The output shaft 24 of the turntable drive device 14 is coupled to the turntable 13. Therefore, driving the turntable drive device 14 enables rotation of the turntable 13 in a normal rotation direction and a counter rotation direction. Rotation of the turntable 13 enables rotation of the display 12 on the turntable 13.

The cameras 15 are fixed to an upper portion of the outer periphery of the case 11. The number of the cameras 15 arranged is plural (four in this embodiment). However, the number of the cameras 15 is not limited to four. The cameras 15 are arranged on the case 11 at predetermined intervals (preferably, equal intervals) in a circumferential direction. The cameras 15 are capable of capturing an image outside the case 11. In this embodiment, arranging the four cameras 15 on the case 11 enables imaging over the entire range (360 degrees) outside and around the case 11. The cameras 15 are capable of capturing and obtaining images of an observer near the case 11 (display 12) and a background image.

Control System of Stereoscopic Video Display Device

Figure 4:
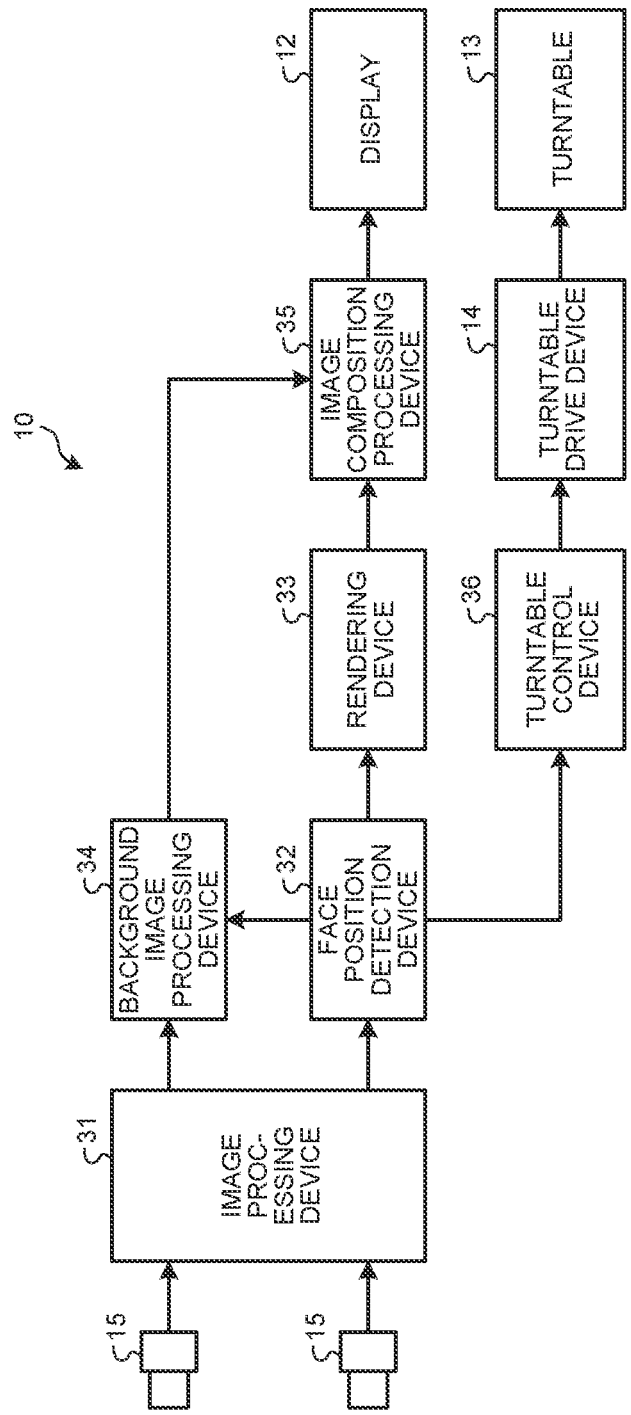
FIG. 4 is a block diagram illustrating a control system of the stereoscopic video display device.

FIG. 4 is a block diagram illustrating a control system of the stereoscopic video display device.

As illustrated in FIG. 4, the stereoscopic video display device 10 includes, in addition to the case 11 (see FIG. 1), the display 12, the turntable 13, the turntable drive device 14, and the cameras 15: an image processing device (image processing unit) 31; a face position detection device (observer position detection device (observer position detection unit)) 32; a rendering device (rendering unit) 33; a background image processing device (background image processing unit) 34; an image composition processing device (image composition processing unit) 35; and a turntable control device (rotation control device (rotation control unit)) 36. The plural cameras 15 transmit images that have been captured by the plural cameras 15, to the image processing device 31.

By compositing the images captured by the plural cameras 15, the image processing device 31 generates a continuous all-around image of the entire range (360 degrees) outside and around the stereoscopic video display device 10, the all-around image being continuous. The image processing device 31 transmits the all-around image to the face position detection device 32 and the background image processing device 34. The face position detection device 32 detects a position of an observer near the stereoscopic video display device 10. In this case, the face position detection device 32 detects, on the basis of the all-around image generated by the image processing device 31, the face and eyes of the observer by a technique, such as machine learning, and determines the position of the observer. For example, the face position detection device 32 determines the position of the observer, as an angle to a reference angle. The face position detection device 32 transmits the detected position of the observer, to the rendering device 33, the background image processing device 34, and the turntable control device 36.

The rendering device 33 forms an image of a virtual object according to the position of the observer, the position having been detected by the face position detection device 32. The rendering device 33 generates the image of the virtual object as a stereoscopic image (3DCG) and displays the image on the display 12. In generating the image, the rendering device 33 performs rendering such that the image of the virtual object displayed on the display 12 becomes an image according to a viewpoint of the observer. For example, when the observer is at a reference position, the rendering device 33 generates a front image of the virtual object and displays the front image on the display 12. When the observer is at a position that is shifted from the reference position by 90 degrees in the circumferential direction, the rendering device 33 generates a lateral image of the virtual object and displays the lateral image on the display 12. The rendering device 33 transmits the image of the virtual object, to the image composition processing device 35.

The background image processing device 34 obtains an image of a background behind the display 12. The background image processing device 34 obtains the image of the background behind the display 12 by cutting out the image from the all-around image generated by the image processing device 31. The background image processing device 34 transmits the image of the background behind the display 12, to the image composition processing device 35.

The image composition processing device 35 generates a composite image in which the image of the virtual object formed by the rendering device 33 is superimposed on the image of the background obtained by the background image processing device 34, and transmits the generated image of the virtual object and image of the background to the display 12. The display 12 displays the virtual object and the image of the background.

The turntable control device 36 generates a control signal to cause the display 12 to face the observer at the position detected by the face position detection device 32, and transmits the control signal to the turntable 13. The turntable 13 rotates on the basis of the control signal obtained.

The image processing device 31, the face position detection device 32, the rendering device 33, the background image processing device 34, the image composition processing device 35, and the turntable control device 36 include all or at least one of a central processing unit (CPU), a random access memory (RAM), and a read only memory (ROM). Furthermore, the image processing device 31, the face position detection device 32, the rendering device 33, the background image processing device 34, the image composition processing device 35, and the turntable control device 36 may be integral with one another or may each be separately bodied. The image processing device 31, the face position detection device 32, the rendering device 33, the background image processing device 34, and the image composition processing device 35 are included and equipped in the turntable drive device 14, for example, but may each be included and equipped in any of the case 11, the display 12, the turntable 13, the turntable drive device 14, and the cameras 15.

Stereoscopic Video Display Method

Figure 5:
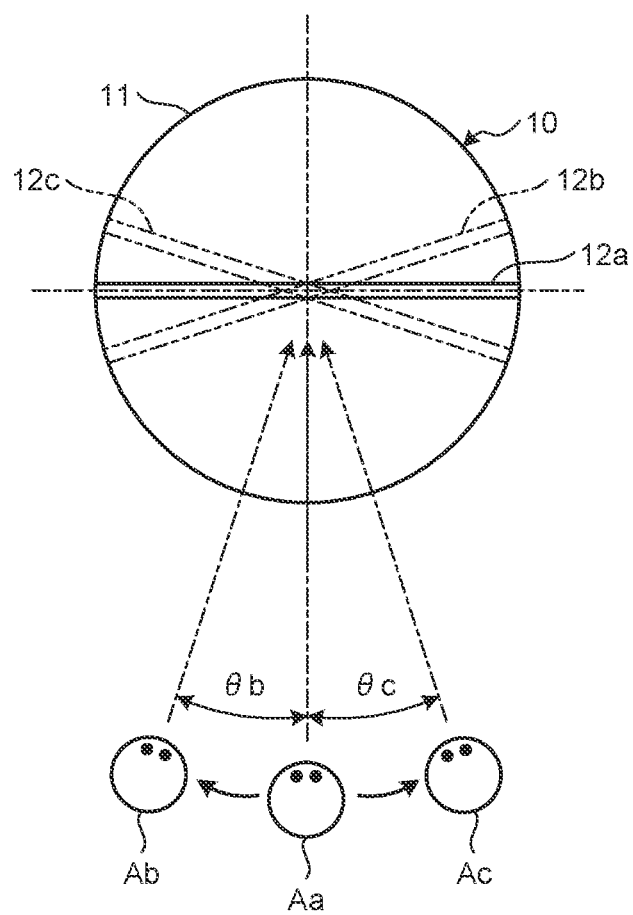
FIG. 5 is a diagram illustrating operation of the stereoscopic video display device.
Figure 6:
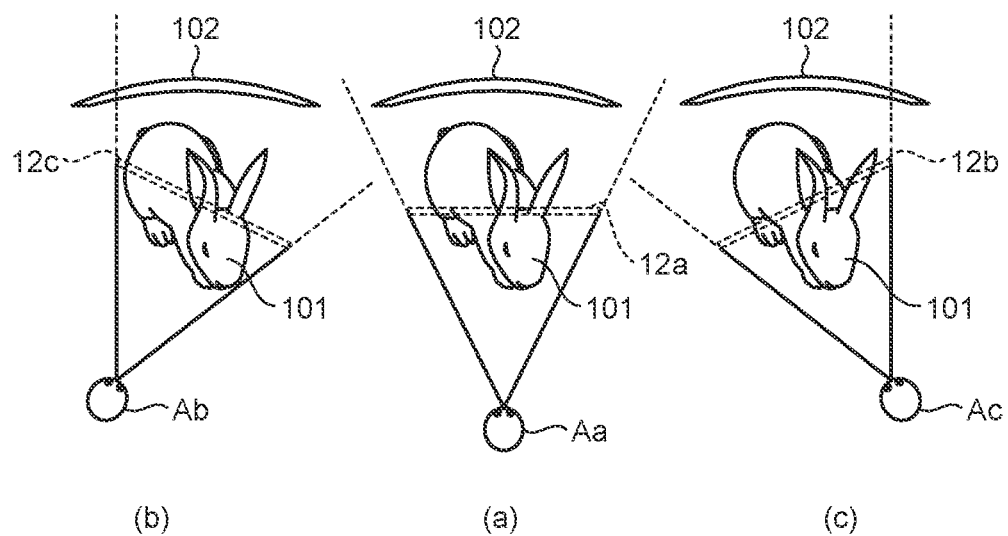
FIG. 6 is a schematic diagram illustrating stereoscopic video display ranges according to positions of an observer.
Figure 7:
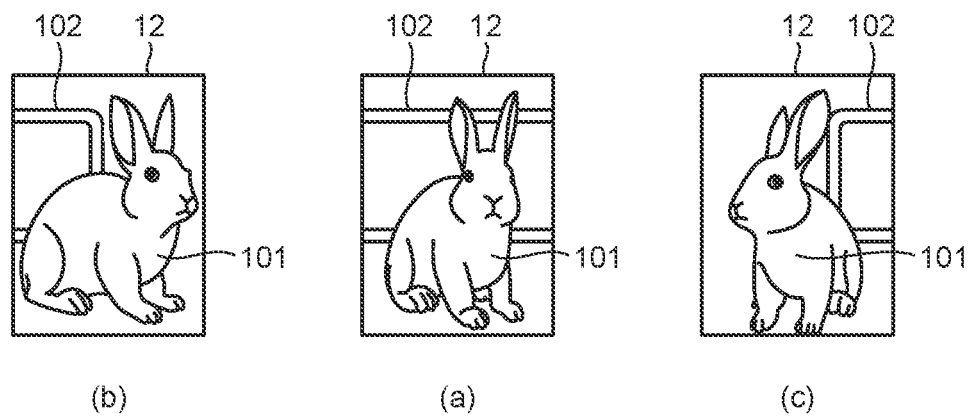
FIG. 7 is a schematic diagram illustrating stereoscopic video display according to positions of the observer.

The following description is on a stereoscopic video display method by the stereoscopic video display device 10. FIG. 5 is a diagram illustrating operation of the stereoscopic video display device, FIG. 6 is a schematic diagram illustrating stereoscopic video display ranges according to positions of an observer, and FIG. 7 is a schematic diagram illustrating stereoscopic video display according to the positions of the observer.

The stereoscopic video display method of the first embodiment includes a step of detecting a position of an observer near the display 12, a step of forming an image of a virtual object according to the position of the observer, a step of rotating the display 12 to cause the display 12 to be opposed to the position of the observer, a step of obtaining an image of a background behind the display 12, and a step of generating a composite image in which the image of the virtual object is superimposed on the image of the background and displaying the composite image on the display 12, the image of the virtual object being in front of the image of the background.

As illustrated in FIG. 4 and FIG. 5, the plural cameras 15 capture images of the entire range outside the stereoscopic video display device 10. By compositing the images captured by the plural cameras 15, the image processing device 31 generates a continuous all-around image of the entire range outside the stereoscopic video display device 10. On the basis of the all-around image resulting from the composition by the image processing device 31, the face position detection device 32 detects a position of the observer. When an observer A is at a position Aa, the face position detection device 32 determines the position Aa as an angle to a reference position. For example, if the position Aa is the reference position, the position Aa of the observer A is determined as an angle θ0.

The turntable control device 36 rotates the turntable 13 and causes the display 12 to move, so that the display 12 faces the observer at the position Aa, the position Aa having been detected by the face position detection device 32. The rendering device 33 forms an image of a virtual object according to the position Aa of the observer, the position Aa having been detected by the face position detection device 32. For example, the rendering device 33 forms a front image of the virtual object. Furthermore, the background image processing device 34 obtains an image of a background behind a display 12a by cutting out the image from the all-around continuous image resulting from the composition by the image processing device 31. The image composition processing device 35 then generates a composite image in which the image of the virtual object formed by the rendering device 33 is superimposed on the image of the background obtained by the background image processing device 34, and causes the display 12a to display the generated composite image of the image of the virtual object and the image of the background.

In response to movement of the observer A from the position Aa to a position Ab, the face position detection device 32 determines the position Ab of the observer A as an angle θb, with the position Aa serving as the reference position, for example. The turntable control device 36 rotates the turntable 13 by the angle θb and causes a display 12b to move, so that the display 12 faces the observer at the position Ab detected by the face position detection device 32. The rendering device 33 forms an image of a virtual object according to the position Ab of the observer detected by the face position detection device 32. For example, the rendering device 33 forms a diagonally right image of the virtual object. Furthermore, the background image processing device 34 obtains an image of a background behind the display 12b by cutting out the image from the all-around continuous image resulting from the composition by the image processing device 31. The image composition processing device 35 then generates a composite image in which the image of the virtual object formed by the rendering device 33 is superimposed on the image of the background obtained by the background image processing device 34, and causes the display 12b to display the generated composite image of the image of the virtual object and the image of the background.

In response to movement of the observer A from the position Aa to a position Ac, on the other hand, the face position detection device 32 determines the position Ac of the observer A as an angle θc, with the position Aa serving as the reference position, for example. The turntable control device 36 rotates the turntable 13 by the angle θc and causes a display 12c to move, so that the display 12 faces the observer at the position Ac detected by the face position detection device 32. The rendering device 33 forms an image of a virtual object according to the position Ac of the observer detected by the face position detection device 32. For example, the rendering device 33 forms a diagonally left image of the virtual object. Furthermore, the background image processing device 34 obtains an image of a background behind the display 12c by cutting out the image from the all-around continuous image resulting from the composition by the image processing device 31. The image composition processing device 35 then generates a composite image in which the image of the virtual object formed by the rendering device 33 is superimposed on the image of the background obtained by the background image processing device 34, and causes the display 12c to display the generated composite image of the image of the virtual object and the image of the background.

As illustrated in (a) of FIG. 6, when the observer A is at the position Aa, the display 12 is moved to the display 12a so that the display 12 faces the observer A at the position Aa. The rendering device 33 forms a front image of a virtual object 101 according to the position Aa of the observer. The background image processing device 34 obtains an image of a background (for example, a television 102) behind the display 12a by cutting out the image. As illustrated in (a) of FIG. 7, the image composition processing device 35 generates a composite image in which an image of a center portion of the television 102 is superimposed behind the front image of the virtual object 101, and causes the display 12a to display the composite image.

As illustrated in (b) of FIG. 6, when the observer A is at the position Ab, the display 12 is moved to the display 12b so that the display 12 faces the observer A at the position Ab. The rendering device 33 forms a diagonally left image of the virtual object 101 according to the position Ab of the observer. The background image processing device 34 obtains an image of a background (for example, the television 102) behind the display 12b by cutting out the image. As illustrated in (b) of FIG. 7, the image composition processing device 35 generates a composite image in which an image of a left portion of the television 102 is superimposed behind the diagonally left image of the virtual object 101, and causes the display 12b to display the composite image.

Furthermore, as illustrated in (c) of FIG. 6, when the observer A is at the position Ac, the display 12 is moved to the display 12c so that the display 12 faces the observer A at the position Ac. The rendering device 33 forms a diagonally right image of the virtual object 101 according to the position Ac of the observer. The background image processing device 34 obtains an image of a background (for example, the television 102) behind the display 12c by cutting out the image. As illustrated in (c) of FIG. 7, the image composition processing device 35 generates a composite image in which an image of a right portion of the television 102 is superimposed behind the diagonally right image of the virtual object 101, and causes the display 12c to display the composite image.

Second Embodiment

Figure 8:
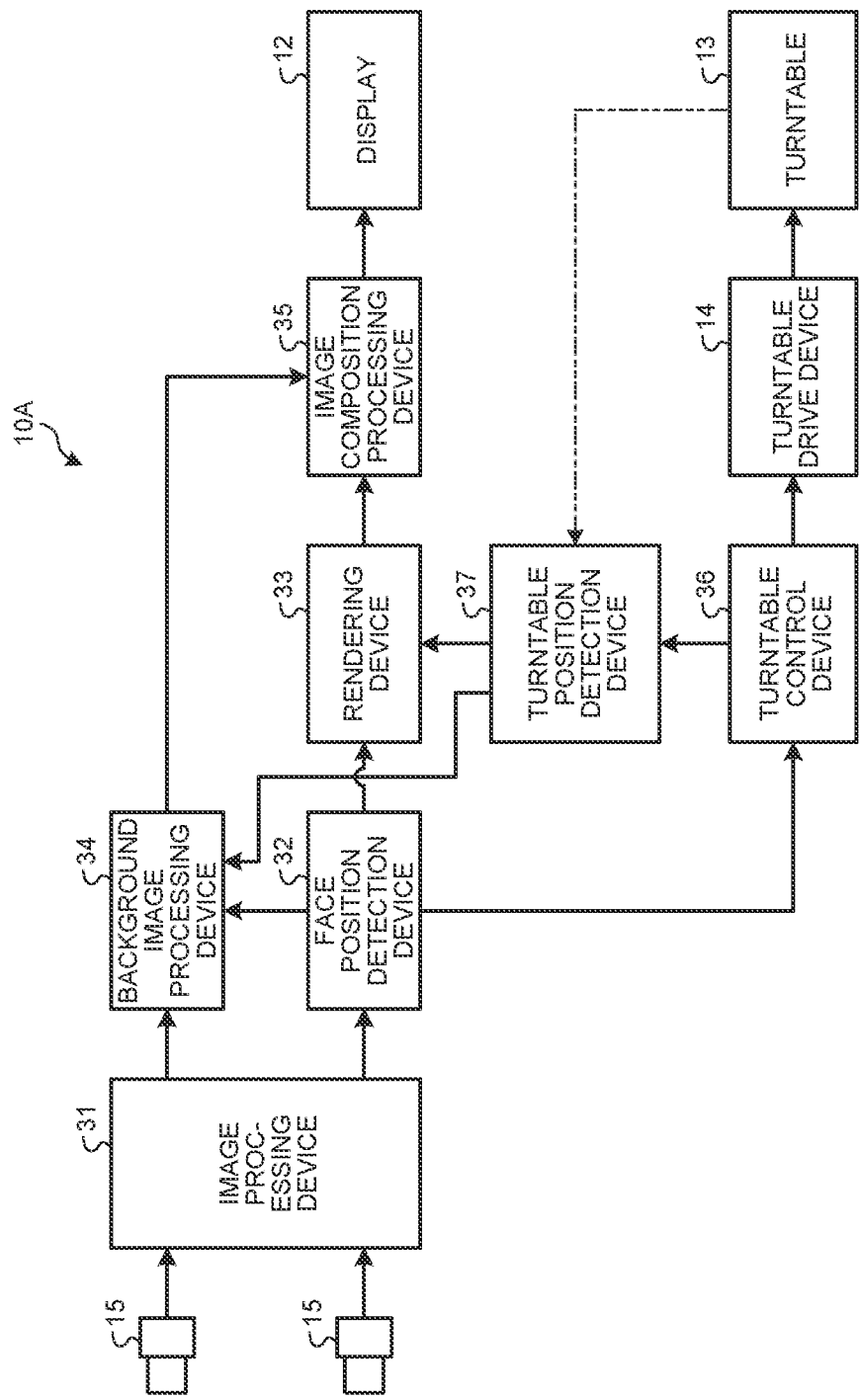
FIG. 8 is a block diagram illustrating a control system of a stereoscopic video display device according to a second embodiment.
Figure 9:
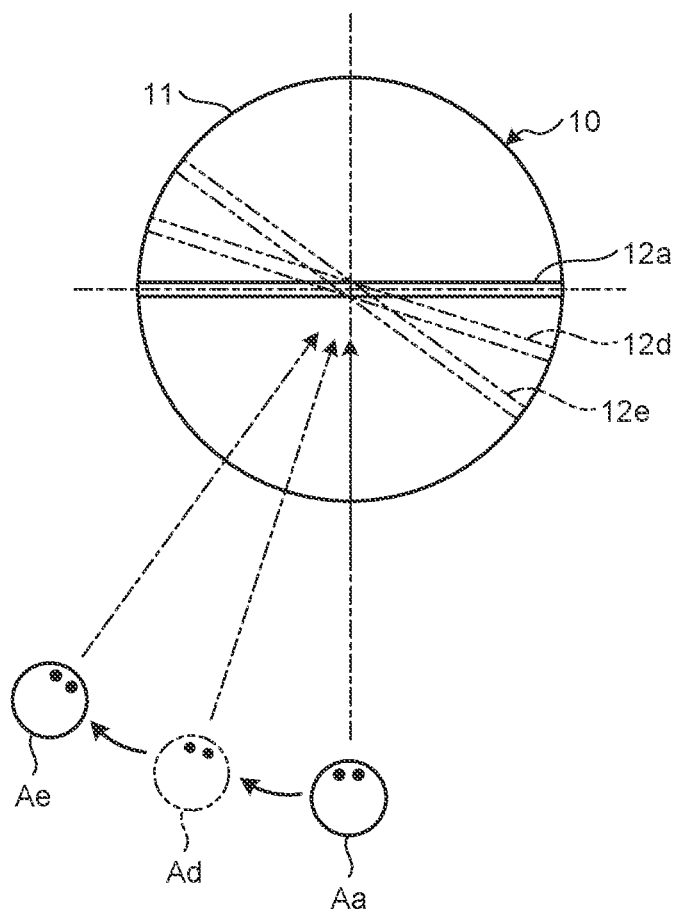
FIG. 9 is a diagram illustrating stereoscopic video display according to positions of an observer.

FIG. 8 is a block diagram illustrating a control system of a stereoscopic video display device according to a second embodiment, and FIG. 9 is a diagram illustrating stereoscopic video display according to positions of an observer. The same reference signs will be assigned to members having functions similar to those of the first embodiment described above, and detailed description thereof will be omitted.

In this second embodiment, as illustrated in FIG. 8, a stereoscopic video display device 10A includes a case 11 (see FIG. 1), a display 12, a turntable 13, a turntable drive device 14, cameras 15, an image processing device 31, a face position detection device 32, a rendering device 33, a background image processing device 34, an image composition processing device 35, a turntable control device 36, and a turntable position detection device (rotational position detection device) 37. The turntable control device 36 transmits control signals to the turntable position detection device 37.

The case 11, the display 12, the turntable 13, the turntable drive device 14, the cameras 15, the image processing device 31, the face position detection device 32, and the turntable control device 36 are similar to those of the first embodiment and description thereof will thus be omitted.

The turntable position detection device 37 detects, on the basis of a control signal from the turntable control device 36, a position of the turntable 13, that is, a rotational position of the display 12 integral with the turntable 13. The turntable position detection device 37 may calculate the position of the turntable 13 from a motor rotation rate at the turntable drive device 14, or directly detect a rotational position of the turntable 13.

The turntable position detection device 37 detects an actual rotational position of the turntable 13. That is, as illustrated in FIG. 8 and FIG. 9, in response to movement of an observer A from a position Aa to a position Ae, the turntable control device 36 controls driving of the turntable drive device 14, rotates the turntable 13 to a predetermined position that is a position of a display 12e, so that the display 12 faces the observer A at the position Ae. If the observer A moves from the position Aa to the position Ae quickly then, the display 12 moves to the display 12e belatedly due to delay in control by the turntable control device 36 and time for driving the turntable drive device 14. That is, when the observer A reaches the position Ae, the display 12 is still at a position of a display 12d facing the observer A at a position Ad. The turntable position detection device 37 transmits an actual rotational position of the turntable 13 to the rendering device 33.

Therefore, in this second embodiment, when the display 12 is still at the position of the display 12d even though the observer A has reached the position Ae, the rendering device 33 forms an image of a virtual object corresponding to the actual rotational position of the turntable 13 detected by the turntable position detection device 37, that is, the actual position of the display 12d. Furthermore, the background image processing device 34 also obtains an image of a background behind the display 12d by cutting out the image, according to the actual rotational position of the turntable 13, that is, the actual position of the display 12d. The image composition processing device 35 generates a composite image in which the image of the background is superimposed behind the image of the virtual object 101, and causes the display 12d to display the composite image.

Thereafter, in response to the turntable 13 rotating and the display 12 reaching the position of the display 12e facing the observer A at the position Ae, the rendering device 33 forms an image of a virtual object corresponding to the position of the display 12e, and the background image processing device 34 obtains an image of a background behind the display 12e by cutting out the image. The image composition processing device 35 generates a composite image in which the image of the background is superimposed behind the image of the virtual object 101, and causes the display 12e to display the composite image.

The turntable position detection device 37 includes all or at least one of a central processing unit (CPU), a random access memory (RAM), and a read only memory (ROM). Furthermore, the turntable position detection device 37 may be integral with the image processing device 31, the face position detection device 32, the rendering device 33, the background image processing device 34, the image composition processing device 35, and/or the turntable control device 36, or these may each be separately bodied. The turntable position detection device 37 is included and equipped in the turntable drive device 14, for example, but may be included and equipped in any one of the case 11, the display 12, the turntable 13, the turntable drive device 14, and the cameras 15.

Modified Example of Second Embodiment

FIG. 10 is a diagram illustrating a modified example of the stereoscopic video display according to positions of an observer, at the stereoscopic video display device according to the second embodiment.

As illustrated in FIG. 8 and FIG. 10, the turntable control device 36 rotates the turntable 13 so that the display 12 faces an observer at a position detected by the face position detection device 32. For this rotation, when an observer A has moved in a predetermined time period that has been set beforehand by an angle larger than an angle θb or θc to a position detected by the face position detection device 32, the turntable control device 36 rotates the turntable 13 and the display 12 so that the display 12 faces the observer A at the position.

If the display 12 is rotated every time the observer A has moved by a small amount, the turntable drive device 14 will rotate the turntable 13 frequently, sound of a motor being driven is generated at all times, and the observer A is likely to sense the sound of the motor being driven as noise. Therefore, the turntable control device 36 does not rotate the turntable 13 when the observer A moves to a position within the angle θb or θc. However, the rendering device 33 forms an image of a virtual object corresponding to a position to which the observer A has moved by a small amount, and the background image processing device 34 obtains an image of a background behind a display 12e corresponding to the position to which the observer A has moved by the small amount, by cutting out the image. The image composition processing device 35 generates a composite image in which the image of the background is superimposed behind the image of the virtual object 101, and causes the display 12e to display the composite image.

The turntable control device 36 may rotate the turntable 13 when the observer A is moving to a position within the angle θb or θc by exceeding the predetermined time period that has been set beforehand, the position having been detected by the face position detection device 32. That is, in a state where the turntable 13 has stopped and the observer A is moving within the angle θb or θc, the turntable 13 may be rotated so that the display 12 faces the observer A if the predetermined time period has elapsed since the stoppage of the turntable 13.

Furthermore, an upper limit is preferably set for rotational speed of the turntable 13 by the turntable control device 36. Rotating the turntable 13 at a low speed enables reduction of generation of large noise of the motor being driven, reduction of rotational vibration of the turntable 13, and reduction of electric power consumed for driving.

Functions and Effects of Embodiments

Included in the embodiment are the display 12 (image display unit) that displays an image, the face position detection device (observer position detection unit) 32 that detects a position of a nearby observer, the rendering device 33 that forms an image of a virtual object corresponding to the position of the observer detected by the face position detection device 32, the turntable drive device 14 (rotation unit) that rotates the display 12 to a position facing the observer detected by the face position detection device 32, the cameras (background image obtainment units) 15 that obtain images of backgrounds behind the display 12, and the image composition processing unit device 35 that generates a composite image in which the image of the virtual object is superimposed on the image of the background and displays the composite image on the display 12, the image of the virtual object being in front of the image of the background.

Therefore, the image of the virtual object 101 and the image of the background are able to be appropriately displayed on the display 12d according to the position of the observer. As a result, stereoscopic videos that do not look wrong to observers are able to be displayed.

In the embodiment, the turntable position detection device (rotational position detection unit) 37 that detects a rotational position of the display 12 is provided, the rendering device 33 forms an image of a virtual object corresponding to the rotational position detected by the turntable position detection device 37, and the background image processing device 34 forms a background image corresponding to the rotational position detected by the rotational position detection device 37. Therefore, even if there is a delay in movement of the display 12, an appropriate image is able to be displayed at the display 12d.

In the embodiment, when an observer has moved to a position by an angle larger than a predetermined angle within a predetermined time period that has been set beforehand, the position having been detected by the face position detection device 32, the turntable control device 36 rotates the display 12 to a position facing the observer. Therefore, not rotating the display 12 more than needed and reducing frequent generation of sound of the motor being driven in the turntable drive device 14 enable reduction of discomfort provided to the observer.

The stereoscopic video display device 10 according to the present disclosure has been described thus far, but implementation in various different modes other than the above-described embodiments is possible.

Each component of the stereoscopic video display device 10 has been functionally and/or conceptually illustrated in the drawings, and is not necessarily configured physically as illustrated in the drawings. That is, the specific form of each device is not limited to the one illustrated in the drawings, and all or a part of each device may be functionally or physically separated or integrated in any units according to, for example, the processing load on the device and the use situation of the device.

The configuration of the stereoscopic video display device 10 is, for example, implemented as software by programs loaded into a memory. With respect to the embodiments, functional blocks implemented by cooperation among these pieces of hardware or pieces of software have been described above. That is, these functional blocks may be implemented in any of various forms, by hardware only, software only, or a combination of hardware and software.

The above-described components include those that are easily expected by persons skilled in the art, and those that are substantially the same. Furthermore, the above-described configurations may be combined as appropriate. In addition, without departing from the gist of the present invention, various omissions, substitutions, or modifications of the configurations are possible.

Furthermore, the basic configuration of the stereoscopic video display device 10 is not limited to the above-described embodiments. For example, the positions of the display 12, turntable 13, and turntable drive device 14 may be set as appropriate, the positions being relative to the case 11. Furthermore, the turntable drive device 14 is capable of rotating the display 12 integral with the turntable 13, by rotating the turntable 13, but the turntable drive device 14 may be capable of directly rotating the display 12.

A program for performing the stereoscopic video display method described above may be provided by being stored in a non-transitory computer-readable storage medium, or may be provided via a network such as the Internet. Examples of the computer-readable storage medium include optical discs such as a digital versatile disc (DVD) and a compact disc (CD), and other types of storage devices such as a hard disk and a semiconductor memory.

According to the present disclosure, an effect is achieved, the effect being an effect enabling display of a stereoscopic video that does not look wrong to an observer.

A stereoscopic video display device, a stereoscopic video display method, and a program, according to the present disclosure are applicable to, for example, all-around stereoscopic image display devices.

Although the present disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A stereoscopic video display device, comprising:
an image display unit configured to display an image;
a drive device that rotates the image display unit to a position facing an observer;
a camera that obtains an image of a background behind the image display unit;
a memory that stores executable components; and
a processor that executes the executable components, the executable components comprising:
an observer position detection unit that detects a position of the observer;
a rendering unit that forms an image of a virtual object corresponding to the position of the observer detected by the observer position detection unit; and
an image composition processing unit that generates a composite image in which the image of the virtual object formed by the rendering unit is superimposed on the image of the background obtained by the camera, and displays the composite image on the image display unit, wherein
the drive device does not rotate the image display unit when the observer position detection unit detects that the observer moves to the position facing the observer by an angle not larger than a predetermined angle,
the rendering unit forms the image of the virtual object when the observer position detection unit detects that the observer moves to the position facing the observer by the angle not larger than the predetermined angle, and
the camera obtains the image of the background behind the image display unit when the observer position detection unit detects that the observer moves to the position facing the observer by the angle not larger than the predetermined angle.

2. The stereoscopic video display device according to claim 1, wherein
the executable components further comprise a rotational position detection unit that detects a rotational position of the image display unit, wherein
the rendering unit forms the image of the virtual object corresponding to the rotational position detected by the rotational position detection unit, and
the camera obtains an image of a background corresponding to the rotational position detected by the rotational position detection unit.

3. The stereoscopic video display device according to claim 1, wherein the drive device rotates the image display unit to the position facing the observer in response to movement of the observer to the position detected by the observer position detection unit by an angle larger than the predetermined angle in a predetermined time period that has been set beforehand.

4. A stereoscopic video display method, comprising:

detecting a position of an observer;

forming an image of a virtual object corresponding to the position of the observer when the observer moves to a first position facing the observer by an angle not larger than a predetermined angle;

in response to determining that the observer moves to a second position facing the observer by an angle larger than the predetermined angle, rotating, to the second position facing the observer, an image display unit configured to display an image;

obtaining an image of a background behind the image display unit when the observer moves to the first position facing the observer by the angle not larger than the predetermined angle;

generating a composite image in which the image of the virtual object is superimposed on the image of the background; and displaying the composite image on the image display unit.

5. A non-transitory computer-readable storage medium storing a program causing a computer to execute:

detecting a position of an observer;

forming an image of a virtual object corresponding to the position of the observer when the observer moves to a first position facing the observer by an angle not larger than a predetermined angle;

in response to determining that the observer moves to a second position facing the observer by an angle larger than the predetermined angle, rotating, to the second position facing the observer, an image display unit configured to display an image;

obtaining an image of a background behind the image display unit when the observer moves to the second position facing the observer by the angle not larger than the predetermined angle;

generating a composite image in which the image of the virtual object is superimposed on the image of the background; and displaying the composite image on the image display unit.

* * * * *